Oct. 22, 1963   R. CANTE   3,107,740
CORE-SAMPLING APPLIANCE FOR GRAPHITE-TYPE NUCLEAR REACTOR
Filed May 24, 1960   3 Sheets-Sheet 3

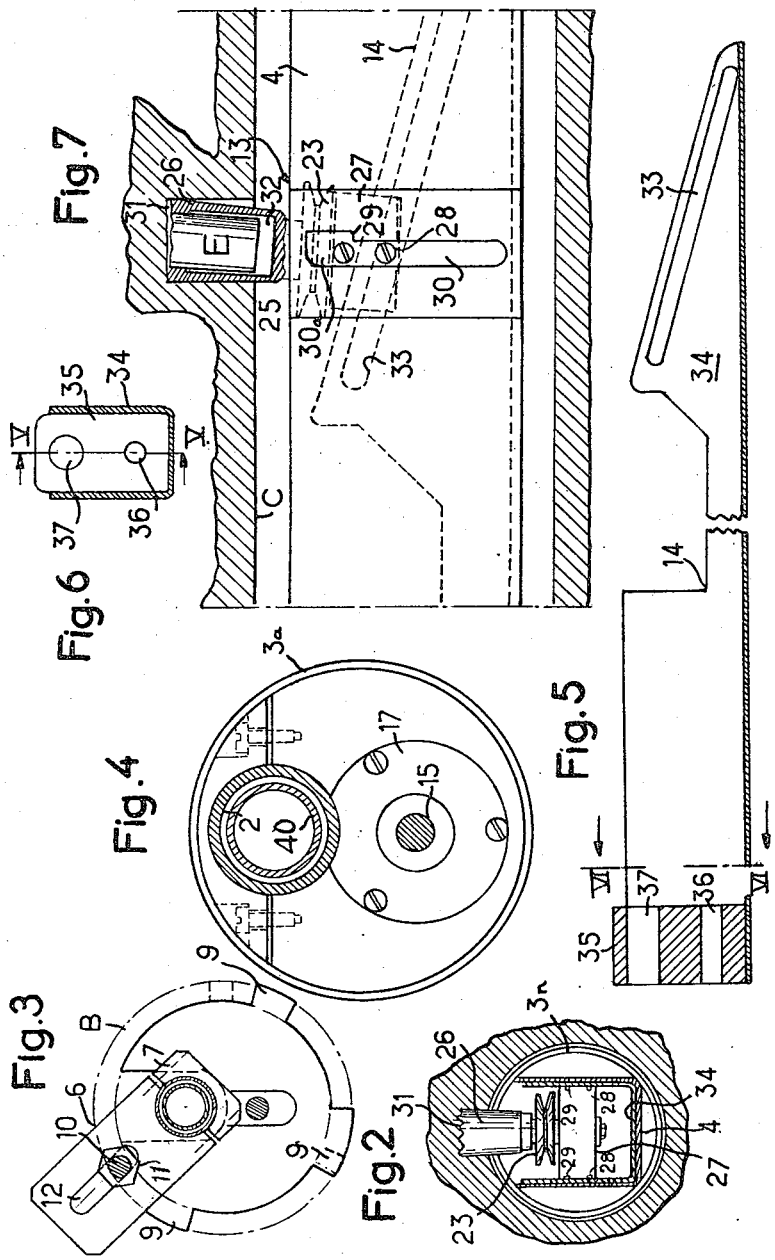

United States Patent Office 3,107,740
Patented Oct. 22, 1963

3,107,740
CORE-SAMPLING APPLIANCE FOR GRAPHITE-TYPE NUCLEAR REACTOR
Roger Cante, Roquemaure, France, assignor to Commissariat a l'Energie Atomique, Paris, France
Filed May 24, 1960, Ser. No. 31,300
Claims priority, application France May 30, 1959
6 Claims. (Cl. 175—78)

In a graphite-type reactor, it is of the greatest importance to follow the variation in the energy stored in the graphite due to neutron flux. A knowledge of the quantity of energy capable of being liberated enables the instant at which the reactor reheats to be determined, and the temperatures reached during operation to be evaluated.

This variation may be determined by examination of samples extracted from the assembly of graphite blocks within the reactor as a whole.

The device to which the invention relates aims to embody an appliance called a "core-sampling appliance," enabling such samples to be taken in the form of small cylinders or "core-samples" cut out of the internal walls of the ducts in the stacks of a nuclear reactor. The invention also aims to embody an appliance which enables the said core-samples to be cut out without impairing the properties of the graphite which it is desired to analyse, and in particular without raising the temperature of the said graphite during cutting.

The core-sampling appliance to which the invention relates, and which enables these objects to be attained, is notable more particularly in that it comprises a combination of a frame of elongated shape capable of being introduced into a duct in the reactor and axially displaced and orientated in the said duct, a cutting tool carried by the said frame and capable of rotating about an axis perpendicular to the longitudinal axis of the frame, a driving motor disposed outside the duct, a transmission linking the motor to the tool in order to drive the said tool in rotation about its axis, means of the "forward-feed" type enabling the said tool to be displaced along its axis, and means enabling the core-sample to be broken off at its base when cutting is finished, in order to separate the said core-sample from the graphite wall and extract it from the duct.

The said cutting tool may take the form of an "end cut" milling cutter bearing teeth in the form of a rim and having a cylindrical cavity intended to receive the core-sample; the said milling cutter may have an external back-off enabling it to be slightly tilted when the cutting operation is finished, thus separating the core-sample from the graphite as a whole.

In an improved variant of the foregoing embodiment, the core-sampling appliance is equipped with a cooling system for the cutting tool.

The said cooling system may comprise a nozzle situated in the vicinity of the cutting tool and connected to a tap fast with the frame and near the nozzle, a conduit connected to the tap and to a source of cooling fluid disposed outside the duct, and a rod system placed along the frame and enabling opening of the tap to be regulated from outside the duct.

Other features of the invention will become apparent in the course of the following description, given by way of example only, of an embodiment thereof, reference being made to the appended FIGURES 1 to 9, wherein:

FIGURE 2 is a transverse section along the line II—II in FIGURE 1;

FIGURE 3 is a transverse section through the appliance along the line III—III in FIGURE 1;

FIGURE 4 is a transverse section, on a larger scale, through the appliance along the line IV—IV in FIGURE 1;

FIGURE 5 is a detailed section along the line V—V in FIGURE 6, illustrating one of the pieces of the appliance;

FIGURE 6 is a section through this piece along the line VI—VI in FIGURE 5;

FIGURE 7 is an axial section, on a larger scale, showing the details of the cutting tool and its driving, forward-feed and tilting devices;

Figure 1:
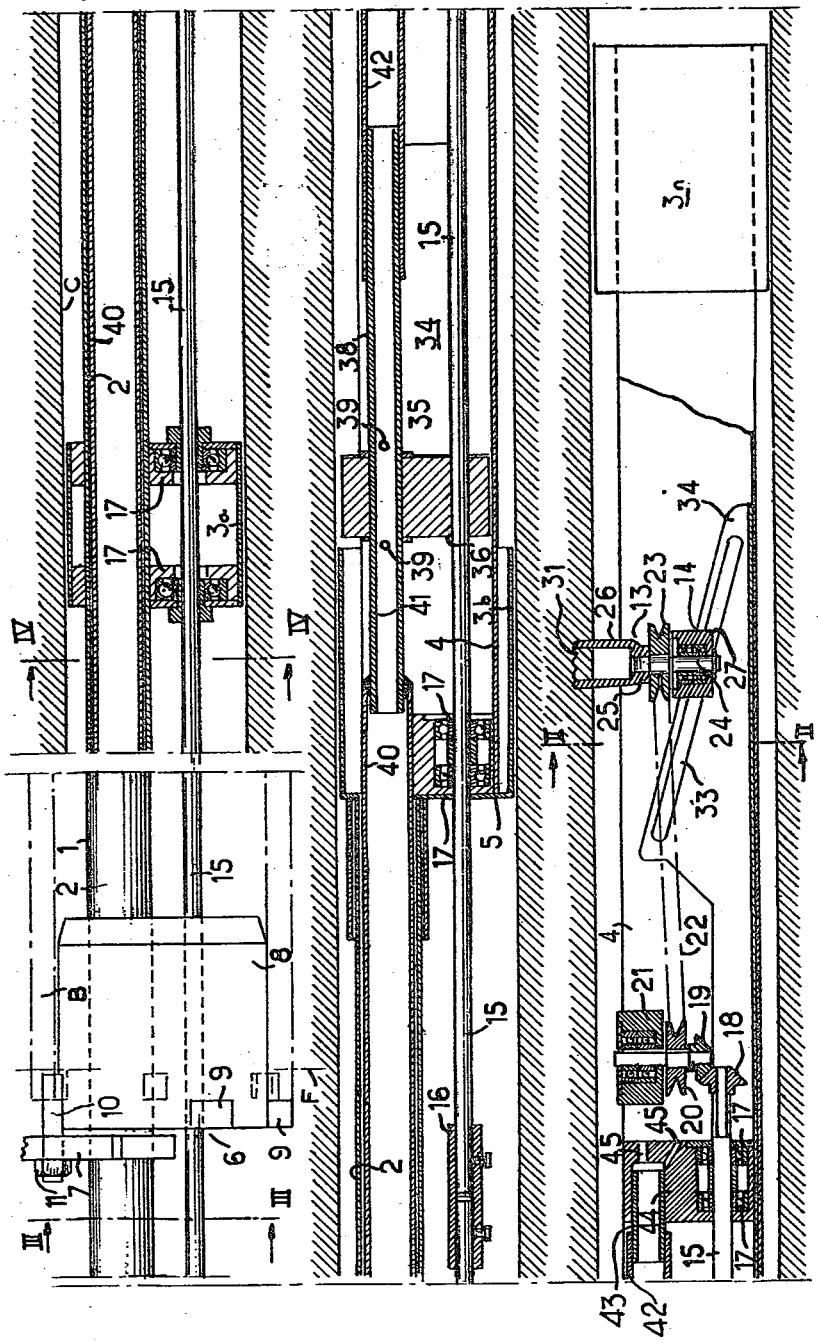
FIGURE 1 is a longitudinal section through the essential part of the appliance in the working position in a reactor duct, three portions of the appliance being illustrated one above the other in order to enable a scale suitable for the purposes of clarity in the drawing to be used.

According to the method of embodiment, the appliance comprises a frame 1 of elongated shape, and of a length related to that of the ducts such as C in the reactor for which the said appliance is intended. The said frame or "handle" comprises a connecting tube 2 and a plurality of carrier sleeves such as 3a, 3b, . . . etc., and 3n. It is to be understood that the three parts of FIGURE 1, disposed vertically one above the other, are really connected to one another to form a single frame having a number of carrier sleeves which may vary according to its length, the said sleeves preferably being disposed at a fixed spacing along the appliance. The external diameter of the said sleeves is equal to the internal diameter of the ducts, except for play, so that the appliance can slide easily in a duct.

The "front" end portion of the frame consists of an elongated U-section profiled element 4, supported at the end by the sleeve 3n, and attached at 5 to the sleeve 3b.

The said frame may be driven into the duct to the distance at which a sample is to be taken. It may be locked externally by a device 6 (FIGURES 1 and 3), which enables the frame to be fixed rotationally and translationally in accordance with the co-ordinates determined for sampling purposes. This device comprises a collar 7 surrounding that part of the connecting tube 2 outside the duct C, and an aluminium buffer 8 fixed in the casing B on the face F of the stack. The said buffer 8 has abutments 9 at its periphery, and a gudgeon 10, which may be fixed in position in an aperture 12 in the collar by means of a nut 11, can bear against the said abutments.

The cutter device 13 and the forward-feed mechanism 14 and the cutting tool are disposed in the U-section element 4 near the "inside" end of the frame (that is to say the end situated in the duct in the graphite). The said tool is driven by a motor disposed outside the said duct; movement is transmitted between the motor and the tool by means of a control rod system 15 made up of a certain number of rods fitted together by sleeves such as 16. The said rod system is supported by ball bearings 17 in which it rotates, the said bearings being mounted in cheeks supported by sleeves such as 3a, 3b, or by the element 4. At the end of the said rod system there is a bevel pinion 18 meshing with another bevel pinion 19 fast with a pulley 20 in a ball bearing 21 supported by the U-shaped element 4. Movement is transmitted from the pulley 20 by a belt 22 to a pulley 23 whereof the spindle 24 has a thread 25 on to which the cutting tool 26 is screwed, the said spindle being moreover journalled in a ball bearing support or tool base 27. The case of this bearing is supported (FIGURE 7) on either side of the appliance by means of two guide lugs 28, 29, attached one below the other to the wall of the case, and capable of sliding in a vertical aperture 30 in the corresponding wall of the U-section element 4. Over the major part of its length, this aperture is equal in width, except for play, to the diameter of the lugs, but comprises a wider portion 30a at its upper end.

The cutting tool 26 is an "end cut" milling cutter, comprising a rim 31 whereof the internal diameter determines the diameter of the sample E which can be taken. The said milling cutter comprises an internal cavity 32. As a non-limitative example of a method of embodiment of the invention, the rim 31 may comprise 8 teeth having a depth of 2.5 mm.; the external and internal diameters of the said milling cutter may be 19 and 15 mm. respectively; the cavity may be 20 mm. deep and 16 mm. in diameter.

The milling cutter has an external back-off which may be of the order of a few degrees, 3° for example.

The driving motor (not illustrated) is attached to a base at the end of the frame. A motor of 0.25 kw. nominal power may, for example, be used, and may impart a speed of 2,000 revolutions per minute to the rotational control rod 15.

The forward-feed device 14, which is intended to impart to the milling cutter a translational movement along its axis, comprises two groove-type cams 33 which are oblique with respect to the axis of the appliance, and are respectively cut out of the flanks of a U-section profiled iron 34 (FIGURES 1, 2, 7). This piece 34, which is called a "forward-feed ramp," slides on the U-section element 4; each of the two lugs 28 on the tool-carrier passes through one of the grooves 33 respectively. The said ramp 34, whereof the shape is clearly shown in FIGURES 5 and 6, comprises at the rear a block 35 fixed between the two flanks of the U; the rod 15 passes freely through the said block 35 at 36, and a forward-feed-control rod system 38, to which the ramp is attached by retaining pins 39, passes through the said block 35. The said rod system 38 comprises a tubular rod 40 inside the connecting tube 2, a pipe 41 welded to the tube 40 and attached to the block 35 as indicated above, and a flexible connector 42 equipped with a pipe 43 fixed in a block 44 which carries some ball bearings 17 supporting the rod 15; the said block 44 is pierced with orifices 45 enabling compressed air forced into the rod system 38 to flow into the front portion of the appliance, and more particularly on to the cutting tool.

The said rod system 38 may be longitudinally displaced by manual actuation.

Figure 8:
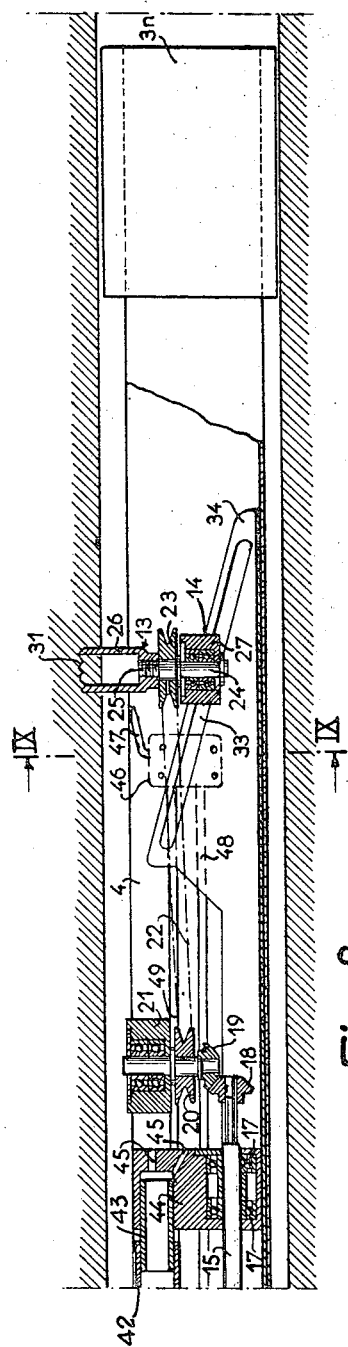
FIGURE 8 is a longitudinal section through the third portion of FIGURE 1 equipped with the cooling system.
Figure 9:
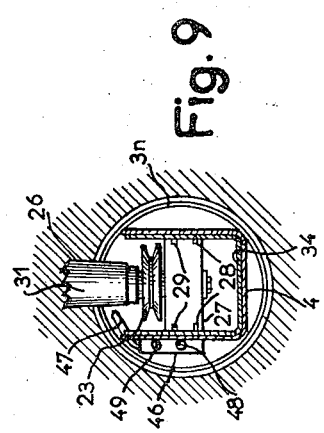
FIGURE 9 is a section through FIGURE 8 along the line IX—IX.

In an improved variant of the foregoing embodiment, which will be described with reference to FIGURES 8 and 9, a tap 46 is attached to the profiled element 4 in the vicinity of the milling cutter 26. This tap, which may advantageously be of the needle type, carries a nozzle 47 directed towards the milling cutter 26. A conduit 48 is connected to the tap 46. The said conduit follows the frame, to which it is attached at regular intervals, and terminates outside the duct containing the core-sampling appliance, and is connected for example to a bottle of liquid carbon dioxide.

The tap 46 is controlled by a rod 49 extending along the frame and supported by the latter. The rod 49 is actuated from the free end of the duct.

Naturally, as in the case of the transmission members already described in the first embodiment, the conduit 48 and the rod 49 are made up of elements assembled end-to-end, so that the whole appliance may be made of the desired length, and is easy to dismantle.

This appliance operates in the following manner:

The forward-feed-control rod 40 having been pulled back with respect to the frame, so as to return the tool-carrier to the vciinity of the base of the U-section element 4, the appliance is driven in to the desired depth in order to place the milling cutter in the position in which it is desired to take a sample. The frame is orientated about its axis according to the desired direction for the tool, and is locked in this position by the collar 7.

The driving motor may then be set in motion, while compressed air is forced into the tube in the forward-feed-control rod system.

As cutting out of the core-sample proceeds, continuous manual pressure is exerted on the rod system which controls the ramp 34, thus feeding the milling cutter forward along its axis, the direction of the latter remaining fixed, and the bearing 27 being guided on both sides of the appliance by the two apertures 30. The two pairs of lugs 28—28 and 29—29 are in the narrow portions of the said apertures 30.

The cavity 32, which leaves play between the internal wall of the milling cutter and the sample E (FIGURE 7), reduces friction and contributes to limiting the heating caused by the cutting operation. The back-off of the milling cutter prevents it from grounding.

The flexible connection by the belt 22 between the two pulleys 20 and 23 allows angular clearance for the transmission while the tool is penetrating the graphite.

When the milling cutter has entirely penetrated the graphite, the pair of lugs 29—29 is in the broadened portion 30a of the apertures 30; withdrawing the frame causes the axis of the milling cutter to tilt, as illustrated in FIGURE 7, this being possible because of the back-off imparted to the milling cutter; the core-sample breaks away from the graphite as a whole and remains in the cavity of the milling cutter. The milling cutter is returned to its original position by actuating the ramp, and the appliance is extracted from the duct.

The core-sample is extracted at the same time as the milling cutter; however, it should be noted that it is preferable to take samples "on the roof" of a duct, in an arc of 60° either side of the vertical, in order to make certain that the core-sample remains inside the milling cutter.

The invention is naturally not limited to the method of embodiment illustrated and described, which has been chosen only by way of example.

I claim:

1. Core sampling apparatus for obtaining samples from the side walls of a bore comprising an elongated element insertable into the bore for axial displacement therein, an end-cut cutting tool tapered toward its base mounted on said element and rotatable about an axis perpendicular to the longitudinal axis of said element, motor means outside of the bore for driving said tool, power transmitting means connecting said motor and said tool, a tool base, forward feed means for moving said tool along its axis, for breaking the core sample off at its base and for removal of the sample including said tool base movable at an angle to the longitudinal axis of said element, two pairs of guide lugs fixed to said base, opposed elongated grooves in said elements receiving said pairs of said lugs for sliding movement therein, a pair of cam grooves mounted for longitudinal movement in said element and constituting an inclined ramp with respect to the longitudinal axis of said element, said ramp engaging a pair of said pairs of lugs and a manually actuated rod system for moving said ramp, said elongated grooves having laterally extending portions at the extreme outer position of said tool, entered by the other pair of said pairs of lugs whereby said tool is tilted and the sample broken from the bore, the taper of said tool being provided for tipping of said tool without binding of said tool in the cut.

2. Core-sampling appliance according to claim 1, wherein the cutting tool takes the form of an "end cut" milling cutter bearing teeth in the form of a rim and having a cylindrical cavity intended to receive the core-sample.

3. Core-sampling appliance according to claim 1, wherein the transmission between the motor and the milling cutter comprises a rotary rod system supported by ball bearings, a first pulley rotationally driven by the said rod system, a second pulley fast with the milling cutter spindle, and a transmission belt linking the said two pulleys.

4. Core-sampling appliance according to claim 1, wherein the said rod system controlling the ramp is tubular, and serves as a pipe for injecting compressed air into the appliance with a view to preventing the milling cutter and the core-sample from becoming heated.

5. Core-sampling appliance according to claim 1, including a cooling system for the said cutting tool.

6. Core-sampling appliance according to claim 5, wherein the cooling system comprises a nozzle situated in the vicinity of the cutting tool and connected to a tap fast with the frame and near the nozzle, a conduit connected to the tap and to a source of cooling fluid disposed outside the duct, and a rod system placed along the frame and enabling opening of the tap to be regulated from outside the duct.

References Cited in the file of this patent

UNITED STATES PATENTS

| | | |
|---|---|---|
| 2,181,512 | Kirby | Nov. 28, 1939 |
| 2,599,405 | Mennecier | June 3, 1952 |
| 2,708,656 | Fermi et al. | May 17, 1955 |